(12) United States Patent
Lin et al.

(10) Patent No.: US 8,591,036 B2
(45) Date of Patent: Nov. 26, 2013

(54) PROJECTOR APPARATUS UTILIZING WEDGE-TYPE LENS

(75) Inventors: Ming-Kuen Lin, Yunlin County (TW); Tsung Hsun Wu, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 345 days.

(21) Appl. No.: 13/022,638

(22) Filed: Feb. 8, 2011

(65) Prior Publication Data

US 2011/0273672 A1  Nov. 10, 2011

(30) Foreign Application Priority Data

May 7, 2010 (TW) ................................ 99114589 A (51) Int. Cl.
*G03B 21/28* (2006.01)

(52) U.S. Cl.
USPC ................................................ 353/33; 349/8

(58) Field of Classification Search
USPC .......................................... 353/33, 81; 349/8
See application file for complete search history.

(56) References Cited

U.S. PATENT DOCUMENTS 5,309,188 A * 5/1994 Burstyn ........................ 353/33

FOREIGN PATENT DOCUMENTS

| CN | 1779551 A | 5/2006 |
|---|---|---|
| CN | 2896319 | 5/2007 |

* cited by examiner

*Primary Examiner* — Seung C Sohn (57) ABSTRACT

A projector apparatus utilizing wedge-type lens for projecting an image onto a surface, comprising a light source module for generating a single first light path; an illumination lens set for inputting the first light path and outputting a second light path; a reflection-type image generator for generating said image; a prism set for inputting said second light path and outputting the second light path onto the reflection-type image generator, wherein the reflection-type image generator reflects the second light path and forming a third light path carrying said image; an image projection lens set disposed on the third light path for projecting said image onto the surface, wherein the illumination lens set including a wedge-type lens working with the prism set for providing a suitable angle of incidence and angle of emission to the reflection-type image generator, the wedge-type lens lowers the required height difference, between the light axles of the illumination lens and the reflection-type image generator, and lowers the angle of emission.

12 Claims, 5 Drawing Sheets

PROJECTOR APPARATUS UTILIZING WEDGE-TYPE LENS

CROSS-REFERENCE TO RELATED APPLICATION

This utility application claims priority to Taiwan Application Serial 099114589, filed May 7, 2010, which is incorporated herein by reference.

BACKGROUND OF THE INVENTION

1. Field of the Invention

The invention relates to a projector apparatus, and in particular, to a projector apparatus which utilizes wedge-type lens therein.

2. Description of the Prior Art

In recent years, the projection apparatuses used in the corporate market are getting introduced in the household market or personal market. For applications of personal portable products, the volume size of projection apparatus and the efficiency of optical engine are important issues, and more particularly, the specific angle of incidence required by the reflection-type image generator built in the projector apparatus needs to be considered especially to tradeoff between the volume size and the optical engine efficiency.

In general, the projection apparatus includes a light source module, an illumination lens set, a reflection-type image generator, a prism set, and an image projection lens set, wherein the reflection-type image generator is usually composed of micromirror units. Each of the micromirror units, flips with respect to a diagonal axis thereof and reflects light into the subsequent image projection lens set (i.e. On) or reflects away from the subsequent image projection lens set (i.e. Off) according to a controlling signal. And arrangement of micromirror unit within the reflection-type image generator is categorized into a rectangular-type arrangement (i.e. the diagonal axis tilted 45 degrees relative to a horizontal reference line) and a diamond-type arrangement (i.e. the diagonal axis tilted 90 degrees relative to a horizontal reference line). Therefore, a corresponding angle of incidence is required for different arrangement; otherwise, the reflection-type image generator can not provide the correct and desired image generation function. While meeting with the required angle of incidence, the corresponding location of the prism set thus designed can not satisfies the expected size of volume and, at the same time, the expected efficiency of optical engine.

Figure 6:
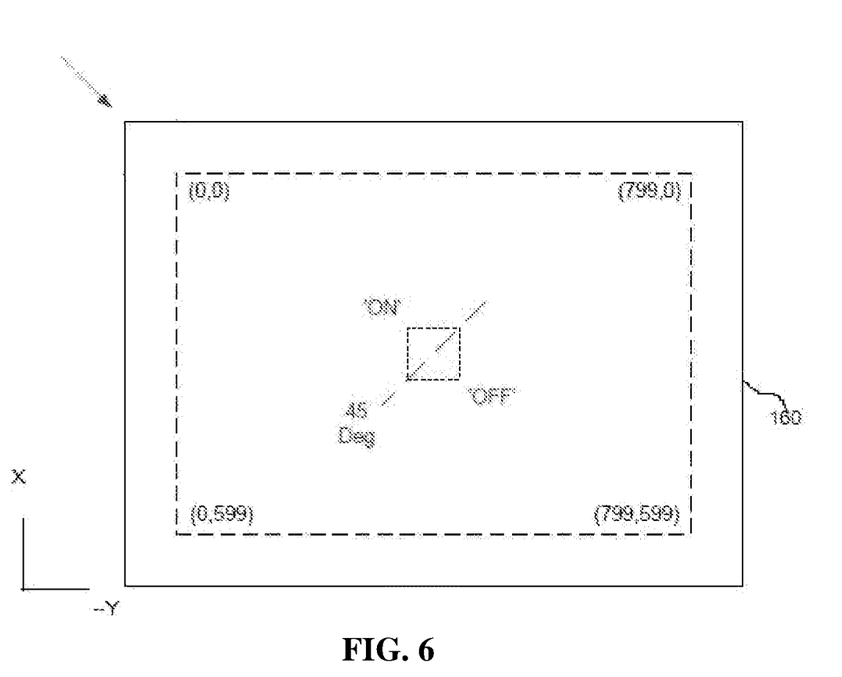
FIG. 6 discloses a rectangular configuration of micromirror unit.

As disclosed in FIG. 6, as the arrangement of micromirror unit is in rectangular configuration, the required incident direction of the primary light will be from the top-left as shown. Therefore, the optical elements utilized before the prism set need to be disposed on the top-left of the reflection-type image generator. Therefore, a minimum difference value in X direction and in Y direction between them is respectively required.

Figure 7:
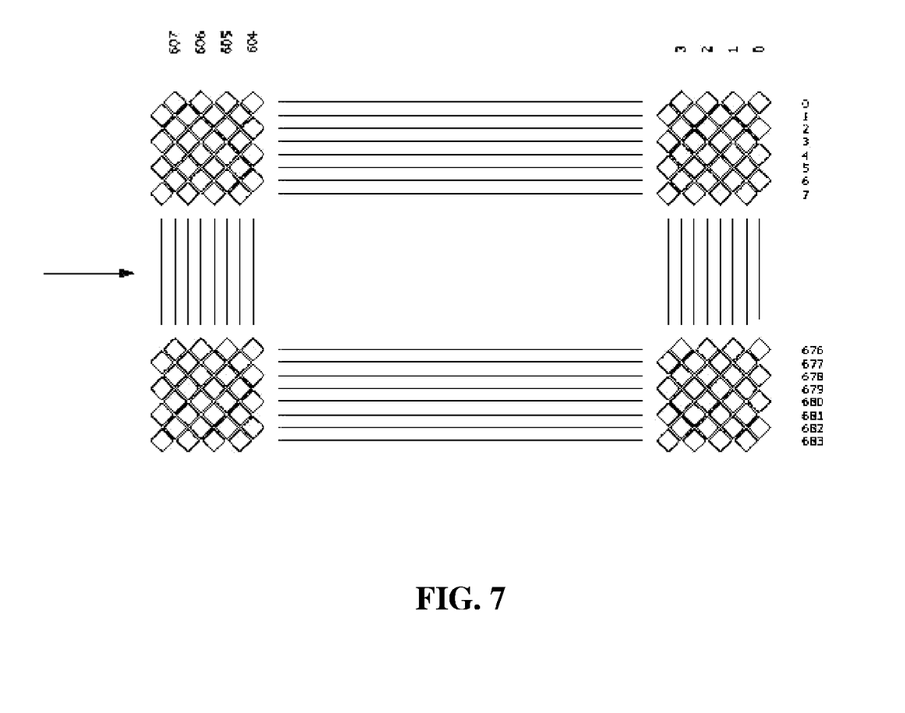
FIG. 7 discloses a diamond configuration of micromirror unit.

As disclosed in FIG. 7, as the arrangement of micromirror unit is diamond configuration, the required incident direction of the primary light will be from the left as shown. Therefore, the optical elements utilized before the prism set need to be disposed on the left of the reflection-type image generator. Therefore, a minimum difference in Y direction between them is required.

Accordingly, it is desired to provide a novel design in this field which could reduce the size of volume of projection apparatus and to enhance the efficiency of optical engine as well.

SUMMARY OF THE INVENTION

A main purpose of the invention is to provide a projection apparatus or an optical module having an expected size of volume and an expected efficiency of an optical engine.

The main purpose of the invention is achieved by an illumination lens set, used in the projector apparatus, having a wedge-type lens.

In specific, the invention relates to a projector apparatus for projecting an image onto a surface. The projector apparatus includes a light source module for generating a first light path; an illumination lens set for inputting the first light path and outputting a second light path; a reflection-type image generator for generating the image; a prism set for inputting the second light path and projecting the second light path onto the reflection-type image generator, wherein the reflection-type image generator forms a third light path carrying the image after reflecting the second light path; and an image projection lens set disposed on the third light path for projecting the image onto the surface, wherein the illumination lens set includes a wedge-type lens working with the prism set for providing a suitable angle of incidence and angle of emission with respect to the reflection-type image generator, and the wedge-type lens lowers a required height difference between light axis of the illumination lens and light axis of the reflection-type image generator, and minimizes the angle of emission.

Under the core inventive spirit recited above, more specific embodiments can be understood by referring to the additional descriptions in the dependent claims.

According to one embodiment, the wedge-type lens defines a light inputting plane, a light outputting plane, a length-wise direction, a width-wise direction, a thickness-wise direction, and a central axis of the length-wise direction. The shape of the inputting plane of wedge-type lens along the length-wise direction is symmetrical with respect to the central axis, and the shape of the outputting plane of wedge-type lens along the length-wise direction is asymmetrical with respect to the central axis.

According to one embodiment, the reflection-type image generator is a digital micromirror device having a plurality of micromirror units. Each of the micromirror units, responsive to a controlling signal, flips to different state with respect to an axis.

According to one embodiment, the axis is tilted 45 degrees relative to a horizontal reference line. Under this condition, the prism set includes a first prism and a second prism, the light illuminated by the first prism meets with the required illumination angle of the reflection-type image generator, and the second prism is a total reflection prism.

According to one embodiment, the axis is tilted 90 degrees relative to a horizontal reference line. Under this condition, the prism set includes a total reflection right-angle prism which includes a light inputting plane and a light outputting plane, and the light illuminated by the total reflection right-angle prism meets with the required illumination angle of reflection-type image generator.

According to one embodiment, the light outputting plane intersects with the central axis of length-wise direction at a point at which an included angle between a normal vector of outputting plane and the central axis of length-wise direction is from about 2.5 degrees to about 15.5 degrees.

According to one embodiment, the light source module includes an LED light source utilizing R light, G light, and B light, and the first light path is formed by a light combiner inputting the R light, G light, and B light.

The above summary of the present invention and embodiments does not intend to cover all possible variations or alterations or every aspects of the present invention.

BRIEF DESCRIPTION OF THE APPENDED DRAWINGS

Each illustrated embodiment of the present invention will be fully understood with reference to the following description in details and the attached drawings.

DETAILED DESCRIPTION OF THE INVENTION

The following exemplary embodiments of the present invention will be further described with reference to the attached drawings. While the present invention has been described with reference to exemplary embodiments, it is to be understood that various changes and modifications may be made and the invention is not limited to the disclosed exemplary embodiments that are use to enable persons skilled in the art to practice the present invention.

The projector apparatus of the invention is for projecting an image onto a surface for people to view the content within the image. The projector apparatus may constitute a single projector or may be in modular form integrating another portable apparatus, such as a cellular phone, into a portable multiple-function apparatus, such as a cellular phone with the function of projection.

In the following recitations, the so-called [light path] means the path on which the light (with or without image) traveling through and the light per se. The light per se might not include any information, or, due to some image processing operation, e.g. the light is reflected by the reflection-type image generator, might include the information to be projected and displayed. For easy understanding the figures in this specification, only the main light line on the light path is shown and other non-main light lines are not shown for brevity.

Figure 1:
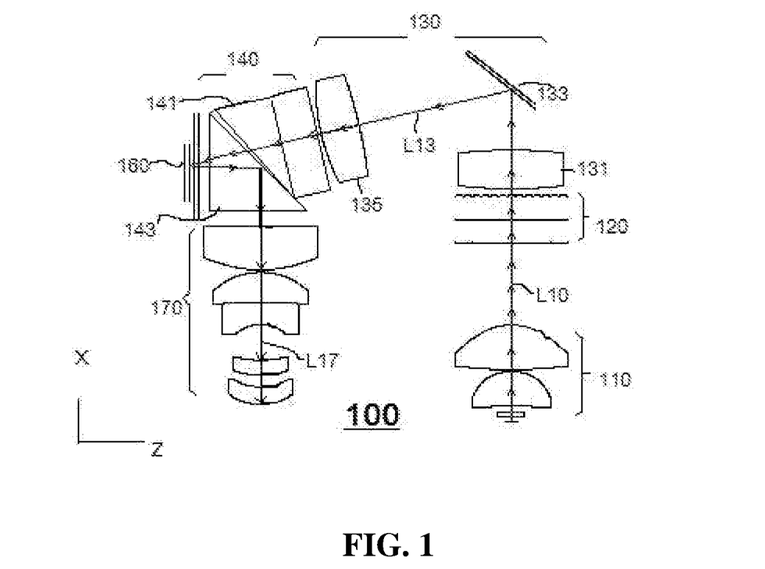
FIG. 1 discloses a projector apparatus according to the first embodiment of the invention.

As shown in FIG. 1, in addition to other well known components taught by the prior art or additional components devised in the future, a projector apparatus 100 of the first embodiment of the invention, under a rectangular configuration shown in FIG. 6, includes a light source module 110 for generating a single first light path L10; a homogenizer 120 inputting the first light path L10 for homogenizing the first light path; an illumination lens set 130 inputting the first light path L10 being homogenized for redirecting the homogenized first light path L10 to a second light path L13, wherein the first light path L10 and the second light path L13 intersects at an angle; a reflection-type image generator 160 for generating said image; a prism set 140 for inputting the second light path L13 and outputting the second light path L13 onto the reflection-type image generator 160, wherein the reflection-type image generator 160 forms a light path carrying the image after reflecting the second light path L13, the light path carrying the image forms a third light path L17 after being totally reflected by the prism set 140; and an image projection lens set 170 disposed on the third light path L17 for projecting the image onto a surface (not shown in the figure).

In FIG. 1, the illumination lens set 130 includes a wedge-type (illumination) lens 135 cooperating with the prism set 140 for providing a suitable angle of incidence and angle of emission to the reflection-type image generator 160. The wedge-type lens 135 is provided for lowering a required height difference between light axis of the illumination lens 130 and light axis of the reflection-type image generator 160, and minimizing the angle of emission. The main purpose of the invention, providing a projector apparatus or module having well-balanced expected size of volume and the expected efficiency of optical engine, is thus achieved.

Figure 2A:
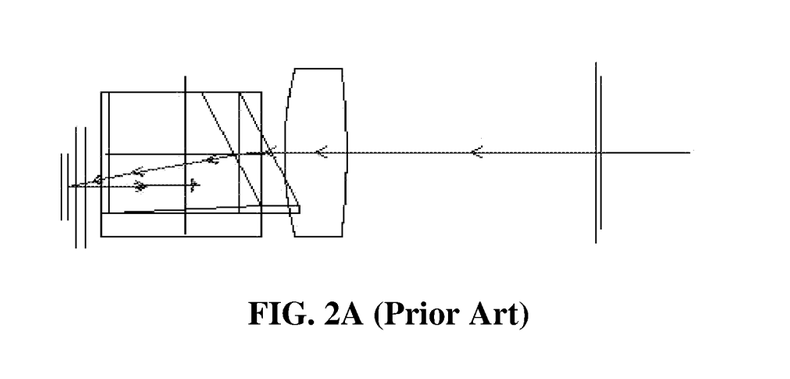
FIG. 2A shows a conventional non-wedge type lens is employed in a projector apparatus.
Figure 2B:
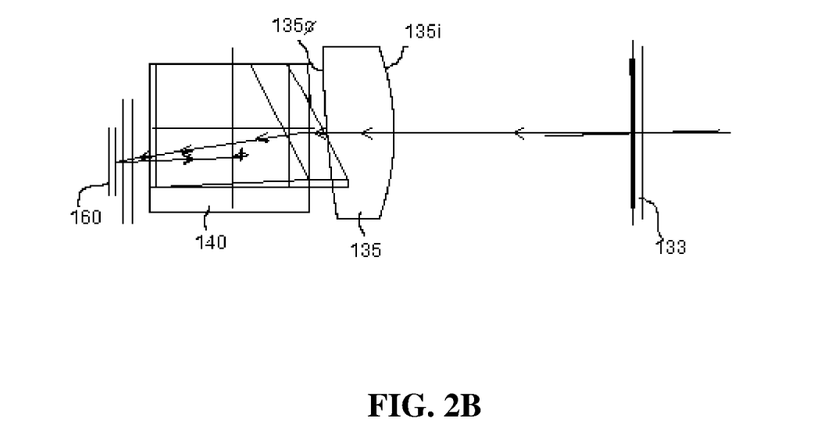
FIG. 2B, compared with FIG. 2A, discloses the effect of the first embodiment shown in FIG. 1.

Please refer to FIGS. 2A (prior art) and FIG. 2B, in this embodiment, since each micromirror unit flips 45 degrees with respect to its axis, the incident direction of primary incident light is required entering from the top-left. Conventionally, in order to provide a necessary angle of incidence, this in turn requires a location difference along X direction (or, length-wise direction) and Y direction (or, height-wise or thickness-wise direction) being large enough between the reflection-type image generator and the light axis of the illumination lens set. To overcome the issue arisen from the conventional approach, referring to FIG. 2B, the present invention provides the wedge-type (illumination) lens 135 to lower the required height difference (i.e. Y direction) between light axis of the illumination lens set 130 and light axis of the reflection-type image generator 160, and minimize the angle of emission as well.

As shown in FIG. 2B, the wedge-type lens 135 defines a light inputting plane 135I, a light outputting plane 135Φ, a length-wise direction, a width-wise direction, a thickness-wise direction, and a central axis of the length-wise direction. The shape of the light inputting plane 135I of wedge-type lens 135 along the length-wise direction is symmetrical with respect to the central axis, and the shape of the light outputting plane 135φ of the wedge-type lens 135 along the length-wise direction is asymmetrical with respect to the central axis. As shown in the foregoing drawings, the required height difference between light axis of the illumination lens set 130 and light axis of the reflection-type image generator 160 is shorter when the outputting plane thereof is asymmetrical (in FIG. 2B) than that when the outputting plane is symmetrical (in FIG. 2A). Under the architecture of the embodiment shown in FIG. 1, in an embodiment, the light source module 110 includes an LED light source. And the LED light source can utilize the configuration of RGGB to directly form the single first light path L10.

Under the architecture of the embodiment shown in FIG. 1, in one embodiment, the light source module 110 includes a light source and a light source distribution modulation module downstream to the light source. The light source distribution modulation module inputs the light generated from the light source, and outputs the first light path L10. Regarding the distribution of the angles of incidence, the first light path L10 outputted from the light source distribution modulation module has appropriate and homogeneous distribution. An embodiment of the light source distribution modulation module includes a collimator of the prior arts.

Under the architecture of the embodiment shown in FIG. 1, in one embodiment, the homogenizer 120 includes a lenslet array forming a light inputting plane 1201 which is imaged on the reflection-type image generator 160. As persons skilled in the art already knew, the lenslet array includes a plurality of micromirrors distributed on the same plane. Each of micromirrors generally has the identical focal length.

As persons skilled in the art should know, the main function of the illumination lens 131 or 135 is to make the light intensity to distribute as even as possible, and to make the unevenness part of low intensity of light as minor as possible. The illumination lens 131, in one embodiment, may be the condenser lens belonging to the prior arts which makes the primary light beam parallel to the light axis of the projector apparatus and lowers the deviation amount as well. The direction guider 133 functions to redirect the first light path L10 to the second light path L13.

One embodiment for the first prism 141 and the second prism 143 can be found in ROC (Taiwan) patent application NO. 981299852.

Due to the provision of the first prism 141 cooperated with the wedge-type lens 135, on one hand, the invention meets the required illumination angle of reflection-type image generator 160. On the other hand, the embodiment can lower the height difference (Y direction) between the prism set 140 and the reflection-type image generator 160, as shown in FIG. 2B. Additionally and optionally, a field lens 150 is typically placed in front of the reflection-type image generator 160, and the main function of the field lens 150 is to increase the viewing angle.

The light path carrying the image forms the third light path L17 after being totally reflected by the second prism 143, and the image projection lens set 170 is disposed on the third light path L17 for projecting the image onto a plane. The image projection lens set 170 generally includes a plurality of lenses each of which has different functions to achieve desired functions of magnification and/or projection.

By the above-described arrangement of embodiment disclosed in FIG. 1, the main objective of the invention is realized. By simulation and experimentation, using 0.22 inch digital micromirror device (DMD) within the architecture of the present invention, the height (thickness) of the projector apparatus can be reduced to about 6 mm and the efficiency of optical engine can reach over 10 lm/W.

Figure 3A:
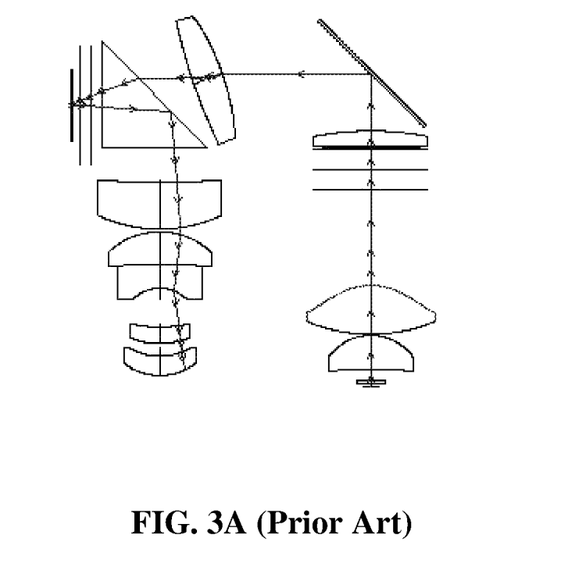
FIG. 3A shows a projector apparatus utilizing conventional non-wedge type lens.
Figure 3B:
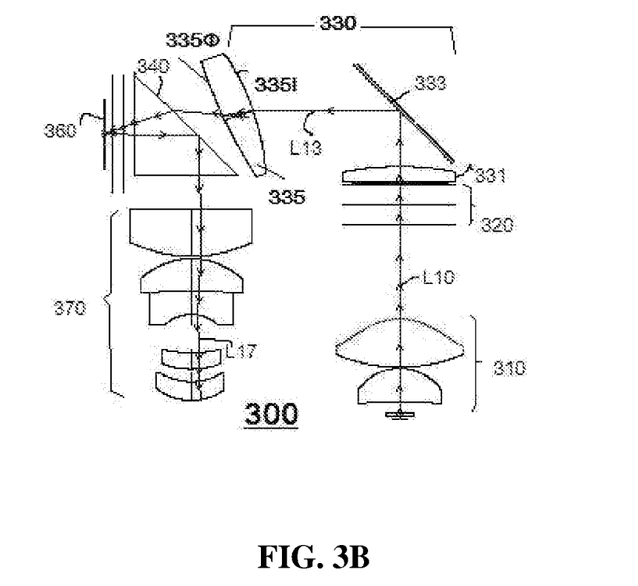
FIG. 3B, compared with FIG. 3A, discloses a projector apparatus according to the second embodiment of the invention.

As shown in FIG. 3B which is another embodiment of the present invention, in addition to other components of the prior arts or the additional components might be produced in the future, under the diamond configuration shown in FIG. 7, the projector apparatus 300 includes a light source module 310 for generating a single first light path L10; a homogenizer 320 inputting the first light path L10, for homogenizing the first light path L10; an illumination lens set 330, inputting the first light path L10 being homogenized, for redirecting the first light path L10 to the second light path L13, wherein the first light path L10 and the second light path L13 intersects at an angle; a reflection-type image generator 360 for generating the image; a total reflection right-angle prism 340 for inputting the second light path L13 and projecting the second light path L13 onto the reflection-type image generator 360, wherein the total reflection right-angle prism 340 includes a primary light inputting plane and a primary light outputting plane, and the light illuminated by the total reflection right-angle prism 340 meets the required illumination angle of the reflection-type image generator 360, and afterwards the reflection-type image generator 360 forms a light path carrying the image after reflecting the second light path L13, and the light path carrying the image forms a third light path L17 after being totally reflected by the total reflection right-angle prism 340; and an image projection lens set 370 being disposed on the third light path L17 for projecting the image onto the surface (which is not shown). The conventional approach using a non-wedge type lens is shown in FIG. 3A is provided for comparison purpose, The illumination lens set 330 includes a wedge-type (illumination) lens 335 cooperating with the total reflection right-angle prism 340 for providing a suitable angle of incidence and angle of emission to the reflection-type image generator 360. The wedge-type lens 335 functions to lower a required height difference between the light axis of illumination lens 330 and the light axis of reflection-type image generator 360, and also functions to minimize the angle of emission.

Because the micromirror unit flips 90 degrees with respect to its axle, the incident direction required for the primary incident light is from the left side. For the conventional approaches, Y direction (height-wise, or thickness-wise) difference between light axis of the reflection-type image generator and light axis of the illumination lens set must be large enough to provide required angle of incidence. However, not anticipated by the prior art, the wedge-type lens 335 utilized in the embodiment lowers the required height difference between light axis of the illumination lens set 330 and light axis of the reflection-type image generator 360, and also minimizes the angle of emission.

As shown in FIG. 3B, the wedge-type (illumination) lens 335 defines a light inputting plane 335I, a light outputting plane 335ϕ, a length-wise direction, a width-wise direction, a thickness-wise direction, and a central axis of the length direction, wherein shape of the light inputting plane 335I of the wedge-type lens 335 along the length-wise direction is symmetrical with respect to the central axis, and shape of the light outputting plane 335ϕ of the wedge-type lens 335 along the length-wise direction is asymmetrical with respect to the central axis. The descriptions of wedge-type lens 135 indicated in FIG. 1 and FIG. 2B also apply to the wedge-type lens 335 as noted above. As shown in the drawings, the required height difference between light axis of the illumination lens set 330 and light axis of the reflection-type image generator 360 is shorter when the outputting plane thereof is asymmetrical (as shown in FIG. 3B) than that when the outputting plane is symmetrical (as shown in FIG. 3A). In addition, the light deviation from the central axis of the image projection lens set 370 while entering the lens set 370 is smaller, when the outputting plane thereof is asymmetrical (as shown in FIG. 3B), than that when the outputting plane is symmetrical (as shown in FIG. 3A).

Figure 4:
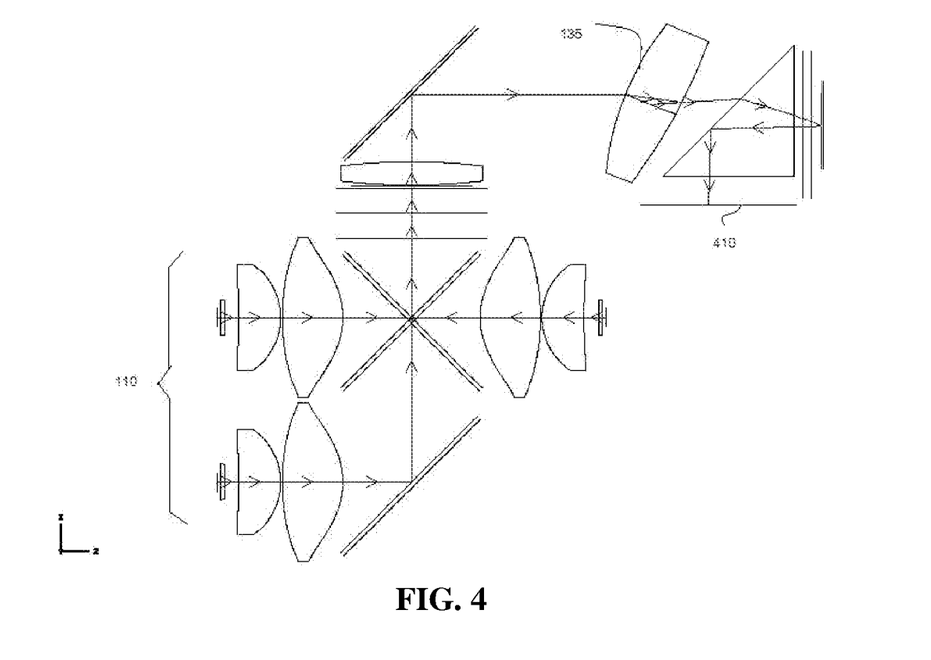
FIG. 4 discloses the light source module 110 can be an LED light source formed by R light, G light, and B light.

Under the architecture of the embodiment shown in FIG. 3B, in one embodiment, the light source module 310 includes an LED light source. And the LED light source can utilize the arrangement of RGGB to directly form the single first light path L10. Or in some embodiments (as shown in FIG. 4), the LED light source module utilizes R light, G light, and B light discretely, and the single first light path L10 is formed by a light combiner inputting the R light, G light, and B light.

Under the architecture of the embodiment shown in FIG. 3B, in an embodiment, the light source module 310 includes a light source and a light source distribution modulation module. The light source distribution modulation module inputs the light generated from the light source and outputs the first light path L10. Regarding the distribution of the angles of incidence, the first light path L10 outputted from the light source distribution modulation module is distributed properly and homogeneously. An embodiment of the light source distribution modulation module includes a collimator of the prior arts, as described above.

As described above, in some embodiments under architecture of the embodiment shown in FIG. 3B, the homogenizer 320 includes a lenslet array forming a light inputting plane 3201 which is imaged on the reflection-type image generator 360. As persons skilled in the arts already know, the lenslet array includes a plurality of micromirrors distributed on the same plane. Typically, each micromirror has a same focal length.

As persons skilled in the art should know, the main function of the illumination lens 131, 135, 331, and 335 is to make the intensity of light to distribute as even as possible, and to make the unevenness part of low intensity of light as trivial as possible. The illumination lens 131 and 331, in one embodiment, may be the condenser lens within domain of the prior art which makes the primary light parallel to the light axis of the projector apparatus and also lowers the deviation amount. The direction guiders 133 and 333 function to redirect the first light path L10 to the second light path L13 respectively.

Due to the provision of total reflection right-angle prism 340 cooperating with the wedge-type (illumination) lens 335, on one hand, the embodiment meets the required illumination angle of reflection-type image generator 360. On the other hand, the embodiment can lower the height difference (Y direction) between the total reflection right-angle prism 340 and the reflection-type image generator 360. The light path carrying the image forms the third light path L17 after being totally reflected by the total reflection right-angle prism 340, and the image projection lens set 370 is disposed on the third light path L17 for projecting the image onto a plane. The image projection lens set 370 generally includes a plurality of lenses having different functions to achieve desired functions of magnification and the projection.

By the above arrangement of embodiment disclosed in FIG. 3B, the main purpose of the invention is realized. By simulation and experimentation, using 0.22 inch digital micromirror device (DMD) within the architecture of the present invention, the height (thickness) of the projector apparatus can be reduced to about 6 mm and the efficiency of optical engine can reach over 10 lm/W.

Figure 5:
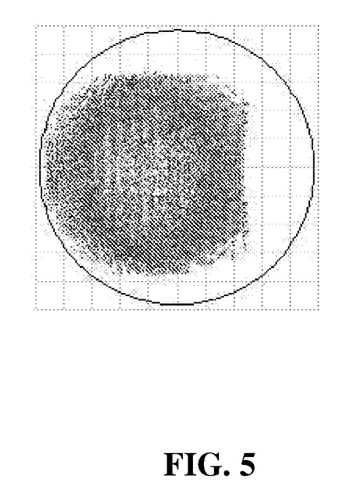
FIG. 5 discloses, in the framework of FIG. 4, the light footprint diagram at the light (inputting) pupil 410 of the image projection lens set 370.

Under the architecture of FIG. 3B, FIG. 5 discloses the light footprint diagram at the light pupil (inputting) 410 of the image projection lens set 370.

Figure 8:
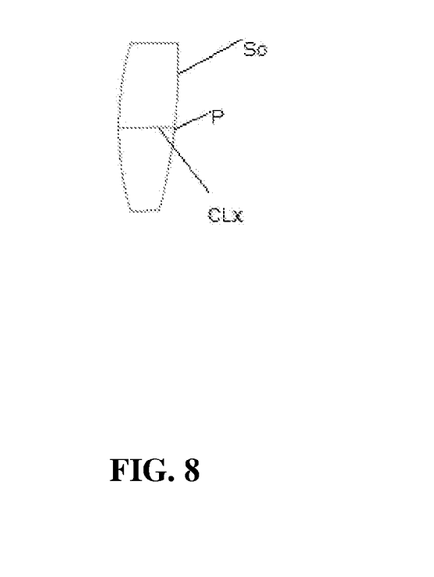
FIG. 8 discloses an embodiment of wedge-type lens.

Please refer to FIG. 8 which shows the wedge-type lens of the foregoing embodiments. As shown in the drawing, the light outputting plane So of the wedge-type (illumination) lens intersects with the central axis of length-wise direction, CLx, at a point P, and it is preferred that an included angle (of normal vector) at this point P, between a normal vector of outputting plane So and the central axis of length-wise direction, is from about 2.5 degrees to about 15.5 degrees, for example, 6.5 degrees.

Table 1 respectively discloses different angles of incidence (AOI) of the primary light onto the reflection-type image generator corresponding to the present invention (the wedge-type lens with 6.5 degrees design) and the prior art (the conventional-type lens design).

TABLE 1

| normal vector included angle of wedge-type lens | | X | Y | Z | AOI |
| --- | --- | --- | --- | --- | --- |
| 6.5 degrees | inputting point of prism | 1.95215 | 0 | −5.94997 | 2.211 degrees |

TABLE 1-continued

| normal vector included angle of wedge-type lens | | X | Y | Z | AOI |
| --- | --- | --- | --- | --- | --- |
| | outputting point of prism | −0.29173 | 0 | −8.19369 | |
| 0.0 degree | inputting point of prism | 2.309328 | 0 | −6.17735 | 5.9836 degrees |
| | outputting point of prism | −0.73999 | 0 | −9.22595 | |

While the present invention has been shown and described with reference to the preferred embodiments thereof and in terms of the illustrative drawings, it should not be interpreted as limited thereby. Various possible modifications and alterations could be conceived of by one skilled in the art to the form and the content of any particular embodiment, without departing from the scope and the spirit of the present invention.

For example, an equivalent alternative may be that the wedge-type lens determines a light inputting plane, a light outputting plane, a length-wise, a width-wise, a thickness-wise direction, and a central axis of length-wise direction, wherein the shape of light inputting plane of wedge-type lens presents an asymmetric relation with respect to the central axis of length-wise direction of the wedge-type lens, and, the light outputting plane of wedge-type lens presents a symmetric relation with respect to the central axis of length-wise direction of the wedge-type lens. Or, another alternation may be the wedge-type lens determines a light inputting plane, a light outputting plane, a length-wise, a width-wise, a thickness-wise direction, and a central axis of length-wise direction, wherein the light inputting plane of wedge-type lens presents an asymmetric relation with respect to the central axis of length-wise direction of the wedge-type lens and the light outputting plane of wedge-type lens also presents asymmetric relation with respect to the central axis of length-wise direction of the wedge-type lens. Under this alternative embodiment (not shown), the light inputting plane of the wedge-type (illumination) lens intersects with the central axis of length-wise direction at a point P', wherein an included angle (of normal vector) at the point P' between a normal vector of the inputting plane and the central axis of length-wise direction, is from about 2.5 degrees to about 15.5 degrees. Such modifications or alternations are also the scope the following claims intend to cover.

What is claimed is:

1. A projector apparatus, utilizing wedge-type lens, for projecting an image onto a surface, comprising:
  a light source module for generating a first light path;
  an illumination lens set for inputting the first light path and outputting a second light path;
  a reflection-type image generator for generating said image;
  a prism set for inputting said second light path and projecting the second light path onto the reflection-type image generator, wherein the reflection-type image generator forms a third light path carrying said image after reflecting the second light path; and
  an image projection lens set disposed on the third light path for projecting said image onto the surface;

wherein the illumination lens set comprises a wedge-type lens cooperating with the prism set for providing a suitable angle of incidence and angle of emission with respect to the reflection-type image generator, and minimizes the angle of emission;

wherein said wedge-type lens defines a light inputting plane, a light outputting plane, a length direction, a width direction, a thickness direction, and a central axis of the length direction, wherein thickness of the wedge-type lens at a first terminal edge thereof is larger than thickness of the wedge-type lens at a second terminal edge thereof.

2. The projector apparatus of claim 1, wherein the wedge-type lens further lowers a required height difference between light axis of the illumination lens and light axis of the reflection-type image generator.

3. The projector apparatus of claim 1, wherein shape of the light inputting plane of wedge-type lens along the length direction is symmetrical with respect to the central axis, and shape of the light outputting plane of wedge-type lens along the length direction is asymmetrical with respect to the central axis.

4. The projector apparatus of claim 3, wherein the prism set has a thickness distribution of smallest thickness at its one end complementing with the first terminal edge of the wedge-type lens and a largest thickness at its another end complementing with the second terminal edge of the wedge-type lens.

5. The projector apparatus of claim 3, wherein the second light path leaving the wedge-type lens passes air medium only once which lowers possible degradation of opto-efficiency.

6. The projector apparatus of claim 3, wherein said reflection-type image generator is a digital micromirror device having a plurality of micromirror units, each of the micromirror units, responsive to a controlling signal, flips with respect to an axle.

7. The projector apparatus of claim 6, wherein said axle is tilted 45 degrees relative to a horizontal reference line.

8. The projector apparatus of claim 6, wherein said axle is tilted 90 degrees relative to a horizontal reference line.

9. The projector apparatus of claim 8, wherein said prism set comprises a total reflection right-angle prism, the total reflection prism comprises a primary light inputting plane and a primary light outputting plane, and the light illuminated by the total reflection right-angle prism meets the required illumination angle of reflection-type image generator.

10. The projector apparatus of claim 9, wherein said light outputting plane intersects with the central axis of length direction at a point, and an included angle, at said point, between a normal vector of outputting plane of the node and the central axis of length direction is from about 2.5 degrees to about 15.5 degrees.

11. The projector apparatus of claim 1, wherein said light source module comprises an LED light source utilizing R light, G light, and B light, and the first light path is formed by a light combiner inputting said R light, G light, and B light.

12. The projector apparatus of claim 1 further comprising:
a homogenizer, inputting the first light path, for homogenizing the first light path.

* * * * *